(12) United States Patent
Kim et al.

(10) Patent No.: US 9,759,950 B2
(45) Date of Patent: Sep. 12, 2017

(54) DISPLAY PANEL AND DISPLAY DEVICE INCLUDING THE SAME

(71) Applicant: LG DISPLAY CO., LTD., Seoul (KR)

(72) Inventors: Yong Sung Kim, Paju-si (KR); Sang Hwa Han, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 14/082,944

(22) Filed: Nov. 18, 2013

(65) Prior Publication Data

US 2014/0204293 A1 Jul. 24, 2014

(30) Foreign Application Priority Data

Jan. 24, 2013 (KR) ........................ 10-2013-0007860

(51) Int. Cl.
*G02F 1/1339* (2006.01)
*G02F 1/1333* (2006.01)
*G02F 1/1335* (2006.01)

(52) U.S. Cl.
CPC ...... *G02F 1/1339* (2013.01); *G02F 1/133308* (2013.01); *G02F 1/133351* (2013.01);
(Continued)

(58) Field of Classification Search
CPC ......... G02F 1/133528; G02F 1/133533; G02F 1/133536; G02F 2001/133531; G02F 2001/133538; G02F 2001/133541; G02F 2001/133543; G02F 2001/133545; G02F 2001/133548; G02F 2001/13355; G02F 1/1335; G02F 2001/133607; G02F 2001/133616; G02F 1/133606; G02F 1/13338; G02F 2001/13312; G06F 3/041; G06F 3/0412; G06F 3/0414; G06F 3/0416; G06F 3/0421; G06F 3/044; G06F 3/045; G06F 3/0488; G06F 2203/04107; G06F 2203/04103; G06F 2203/041;
(Continued)

(56) References Cited

U.S. PATENT DOCUMENTS 4,695,490 A * 9/1987 McClelland ......... C08G 59/502
349/154
5,610,742 A * 3/1997 Hinata et al. ................. 349/122
(Continued)

FOREIGN PATENT DOCUMENTS

EP 0642049 A1 3/1995
JP 2000-148029 A 5/2000
(Continued)

*Primary Examiner* — Dung Nguyen
*Assistant Examiner* — Shan Liu
(74) *Attorney, Agent, or Firm* — Birch, Stewart, Kolasch & Birch, LLP

(57) ABSTRACT

Discussed is a display panel capable of preventing a substrate from being directly exposed to the external and preventing a light leakage. The display panel according to an embodiment includes a lower substrate and an upper substrate coupled to each other and configured to display images; an optical film attached to an upper surface of the upper substrate; and a panel protection member for covering side faces of the lower and upper substrates, wherein at least one side of the optical film extends beyond a side face of at least one side of the upper substrate.

18 Claims, 10 Drawing Sheets

(52) U.S. Cl.
CPC ............... *G02F 1/133528* (2013.01); *G02F 2001/133562* (2013.01)

(58) Field of Classification Search
CPC .... G06F 3/03547; G06F 3/0418; G06F 3/046; G06F 3/047; H05K 9/0079; H05K 9/0073; H05K 9/0081; H05K 9/0088
USPC ............... 349/62–64, 12, 96–103; 345/173
See application file for complete search history.

(56) References Cited

U.S. PATENT DOCUMENTS

| | | | |
|---|---|---|---|
| 6,204,906 B1 | 3/2001 | Tannas, Jr. | |
| 7,903,192 B2* | 3/2011 | Azuma et al. | 349/58 |
| 8,174,632 B2* | 5/2012 | Kim et al. | 349/15 |
| 2007/0191520 A1* | 8/2007 | Sugiki et al. | 524/160 |
| 2008/0068529 A1* | 3/2008 | Tebbit | G02F 1/133308 349/58 |
| 2009/0115942 A1* | 5/2009 | Watanabe | 349/96 |
| 2010/0053499 A1* | 3/2010 | Sasaki | 349/62 |
| 2010/0214521 A1 | 8/2010 | Togashi et al. | |
| 2010/0262152 A1* | 10/2010 | Shadduck | A61B 17/8822 606/94 |
| 2011/0261283 A1* | 10/2011 | Kim et al. | 349/58 |
| 2012/0083180 A1* | 4/2012 | Kim et al. | 445/25 |
| 2012/0206680 A1* | 8/2012 | Onishi | G02F 1/134336 349/122 |
| 2012/0262855 A1* | 10/2012 | Park | G02F 1/133308 361/679.01 |
| 2012/0281383 A1* | 11/2012 | Hwang et al. | 361/807 |
| 2013/0236680 A1* | 9/2013 | Ahn | G02F 1/133308 428/68 |
| 2014/0176848 A1* | 6/2014 | Gupta | C03B 33/0222 349/58 |

FOREIGN PATENT DOCUMENTS

| | | |
|---|---|---|
| JP | 2001-221998 A | 8/2001 |
| JP | 2005-250506 A | 9/2005 |
| JP | 2006-337856 A | 12/2006 |
| KR | 10-2012-0123767 A | 11/2012 |
| WO | WO 94/22044 A1 | 9/1994 |
| WO | WO 2009/028730 A1 | 3/2009 |

* cited by examiner

DISPLAY PANEL AND DISPLAY DEVICE INCLUDING THE SAME

CROSS REFERENCE TO RELATED APPLICATIONS

This application claims the benefit of the Korean Patent Application No. 10-2013-0007860 filed on Jan. 24, 2013, which is hereby incorporated by reference as if fully set forth herein.

BACKGROUND OF THE INVENTION

Field of the Invention

Embodiments of the present invention relate to a display device, and more particularly, to a display panel which is capable of preventing a substrate from being directly exposed to the external environment, and also preventing a light leakage, and to a display device including the display panel.

Discussion of the Related Art

Various display devices, which substitute for CRTs (Cathode Ray Tubes) manufactured in an early stage of display device, have been researched and studied, and examples of such display devices may be liquid crystal display device, plasma display panel, organic light emitting display device, etc.

These display devices are able to achieve a large size by decreasing their weight and volume. Also, these display devices have been highly developed in various aspects such as response speed and picture quality through the continuous study. In addition to the research and development in technical aspects, design aspects of a product that can appeal to consumers have been actively researched and studied. For example, efforts to minimize the thickness of the display device have been made, and a design enabling the good exterior appearance has been developed to expedite purchase of consumers by appealing to the aesthetic sense of the consumers.

However, the related art display device obtained up to now has limitations in the minimization of thickness and the improvement of exterior appearance due to its structural properties.

Meanwhile, the Unexamined Korean Patent Application Publication No P10-2012-0123767 published by the Korean Intellectual Property Office (hereinafter, referred to as "background document"), proposed by the applicant for this patent application, is directed to a display device including a display panel whose front and sides are exposed to the external environment, wherein an upper case and a front set cover are removed so as to minimize the thickness of the display device and to realize a good appearance of the display device.

FIG. 1 is a cross sectional view illustrating a display panel of the display device which may result when the display panel proposed in the background document is manufactured.

Referring to FIG. 1, the display panel of the display device proposed in the background document may include a lower substrate 12, an upper substrate 14 confronting the lower substrate 12, a film member 16 attached to an upper surface of the upper substrate 14, and a panel protection member 20 provided at respective side faces of the lower and upper substrates 12 and 14 bonded to each other.

An inclination face (CF) (slanted corner edges), which is inclined at a predetermined angle by a chamfer process, is formed at the edges of the lower substrate 12 and upper substrate 14, that is, the respective sides of the lower substrate 12 and upper substrate 14.

An end of each side of the film member 16 is provided at a predetermined distance (D) from the inclination face (CF) of the upper substrate 12.

The panel protection member 20 covers the edges of the lower substrate 12 and upper substrate 14, to thereby prevent the display panel from being exposed to the external environment and thus being damaged.

The above display device of the background document, however, has the following disadvantages.

First, as mentioned above, the end of the film member 16 is provided at the predetermined distance (D) from the inclination face (CF) of the upper substrate 14, and an upper case is removed from the display device. Thus, in the front face view of the display panel, a portion between the end of the film member 16 and the inclination face (CF) of the upper substrate 14 might be linearly visible. That is, the portion marked with the distance D in FIG. 1 is exposed to the outside, which in turn can expose the upper substrate 14 to damages.

Also, when the panel protection member 20 is not provided at a uniform thickness enabling to fully cover each inclination face (CF) of the lower substrate 12, the upper substrate 14 and the film member 16, and is not formed in a straight-line shape in the front face view of the display panel, it is difficult to obtain a good appearance of the display device, and furthermore a light leakage might partially occur as shown in FIG. 1.

That is, a burr is formed in the inclination face (CF) provided at each side of the lower substrate 12 and upper substrate 14 by the chamfer process. In this case, if the inclination face (CF) is not perfectly and fully covered by the panel protection member 20, reflected light (RL) may be scattered and reflected on the inclination faces (CFs) by an internal reflection of the lower substrate 12, and then some of the scattered-reflected light (SRL), which is not blocked by a black matrix (BM) of the upper substrate 14, may be exposed to the outside through the inclination faces (CFs). Particularly, in case of the display device of the background document, the upper case is removed, so that the inclination faces (CFs) are exposed to the outside. Thus, as shown in FIG. 2, a light leakage may occur due to the scattered-reflected light (SRL) in the inclination faces (CFs) as shown by the leakage light (SRL) between the BM and the panel protection member 20.

SUMMARY OF THE INVENTION

Accordingly, embodiments of the present invention are directed to a display panel and a display device including the same that substantially obviates one or more problems due to limitations and disadvantages of the related art.

An aspect of embodiments of the present invention is to provide a display panel which is capable of preventing a substrate from being directly exposed to the external environment, and also preventing a light leakage, and to provide a display device including the display panel.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided according to an embodiment a display panel that can include a lower substrate; an upper substrate confronting the lower substrate, the upper substrate bonded to the lower substrate; an upper polarizing film whose size is larger than that of the upper substrate, the upper polarizing film attached to an entire upper surface of the upper substrate; and a panel protection member for covering side faces of the lower and upper substrates, wherein each side of the upper polarizing film is disposed directly above the side faces of the upper substrate and portions of the panel protection member.

In one example, at this time, the side of the upper polarizing extends more than a first width from the side face of the upper substrate, and the panel protection member is formed to have a second width which is larger than the first width, and the panel protection member is attached to the side face of the lower substrate, the side face of the upper substrate, and the lower surface of the extending portion of the upper polarizing film.

In another aspect of embodiments of the present invention, there is provided a display device that can include the above display panel; a guide panel for supporting the boundaries of lower surface of the display panel; a panel adhesive member for connecting the guide panel and the display panel to each other; and a rear cover for receiving the guide panel therein.

In addition, the display device can include a protection pad member for covering the side faces and upper edges of the display panel.

According to an embodiment, the present invention provides a display panel which includes a lower substrate and an upper substrate coupled to each other and configured to display images; an optical film attached to an upper surface of the upper substrate; and a panel protection member for covering side faces of the lower and upper substrates, wherein at least one side of the optical film extends beyond a side face of at least one side of the upper substrate.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Reference will now be made in detail to the exemplary embodiments of the present invention, examples of which are illustrated in the accompanying drawings. Wherever possible, the same reference numbers will be used throughout the drawings to refer to the same or like parts. Further, any one or more features and/or elements from one or more embodiments of the present invention described herein can be applied or combined to any one or more embodiments of the present invention described herein. Further, one or more elements from one or more embodiments of the present invention can substitute one or more elements in another embodiment of the present invention.

On explanation about the embodiments of the present invention, the following details about the terms should be understood.

The term of a singular expression should be understood to include a multiple expression as well as the singular expression if there is no specific definition in the context. If using the term such as "the first" or "the second", it is to separate any one element from other elements. Thus, a scope of claims is not limited by these terms.

Also, it should be understood that the term such as "include" or "have" does not preclude existence or possibility of one or more features, numbers, steps, operations, elements, parts or their combinations.

It should be understood that the term "at least one" includes all combinations related with any one item. For example, "at least one among a first element, a second element and a third element" may include all combinations of the two or more elements selected from the first, second and third elements as well as each element of the first, second and third elements.

Also, if it is mentioned that a first element is positioned "on" or "above" a second structure, it should be understood that the first and second elements may be brought into contact with each other, or one or more other elements may be interposed between the first and second elements. However, if using "directly on," it should be understood that the first and second elements are brought into contact with each other.

Hereinafter, a display panel according to the embodiments of the present invention and a display device including the same will be described with reference to the accompanying drawings. The display panel and a display device having the display panel according to the present invention can be any type of display panel and display device, such as but not limited to a liquid crystal display panel and device, a plasma display panel and device, an organic light emitting display panel and device, an electrophoretic display panel and device, an electro-wetting display panel and device, etc.

Further, all the components of the display panel and the display device of the present invention are operatively coupled and configured.

Figure 1:
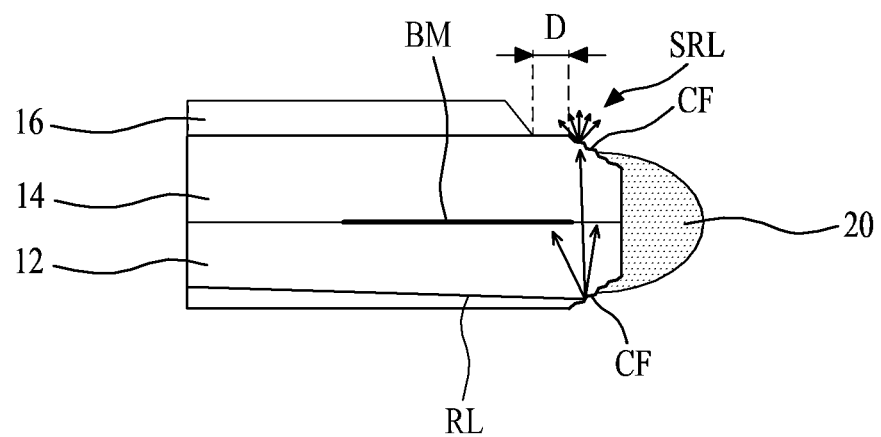
FIG. 1 is a cross sectional view illustrating a display device proposed in a background document.
Figure 2:
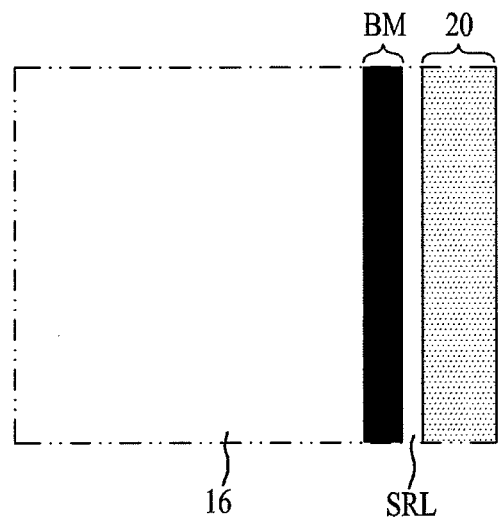
FIG. 2 illustrates a light leakage caused by a scattered reflection occurring in an inclination face of an upper substrate of the display device shown in FIG. 1 according to a related art.
Figure 3:
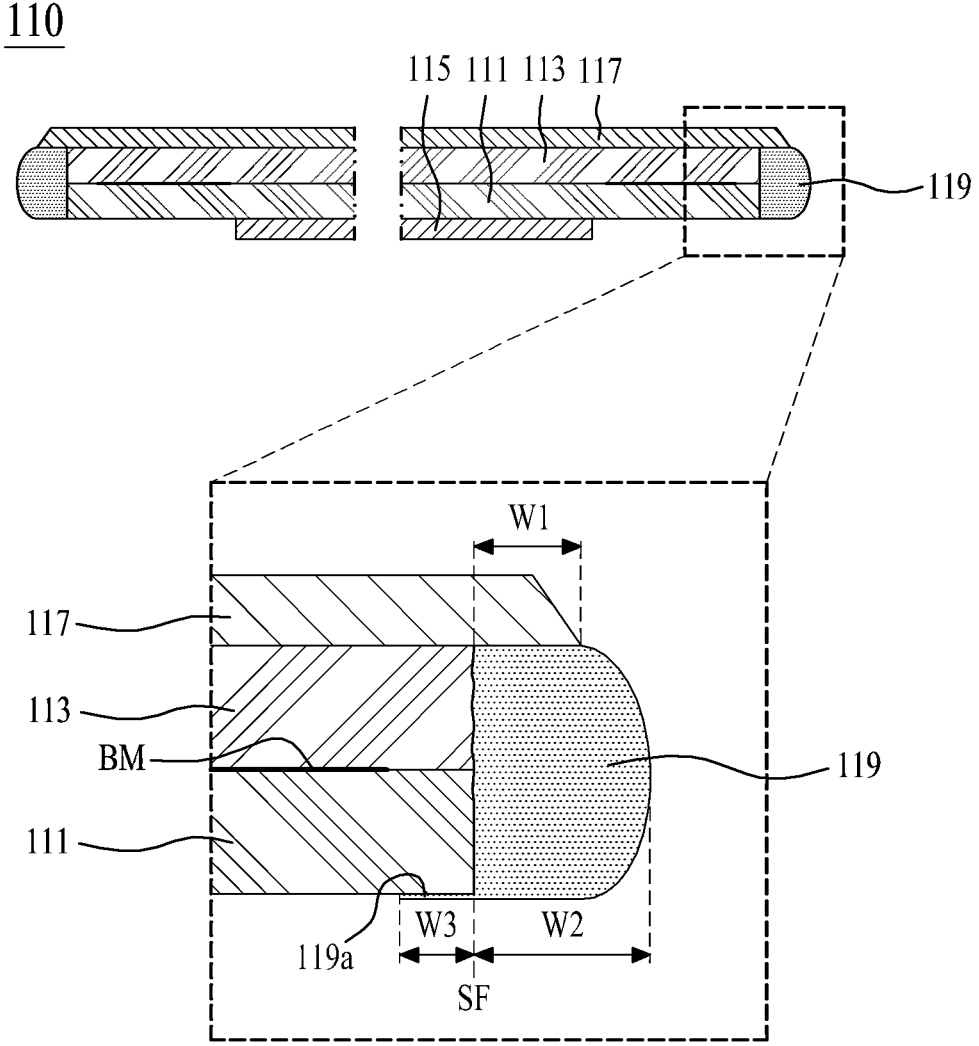
FIG. 3 is a cross sectional view illustrating a display panel according to a first embodiment of the present invention.

FIG. 3 is a cross sectional view illustrating a display panel according to the first embodiment of the present invention.

Referring to FIG. 3, the display panel 110 according to the first embodiment of the present invention may include a lower substrate 111, an upper substrate 113 disposed on the lower substrate 111, an upper polarizing film 117 attached to an entire upper surface of the upper substrate 113, and a panel protection member 119 for covering the side faces of the lower substrate 111 and upper substrate 113. The upper polarizing film 117 is an example of an optical sheet or optical film. At this time, in this example, the lower substrate 111 and the upper substrate 113 confronting each other are bonded to each other with a liquid crystal layer interposed therebetween; however, the invention is not limited to thereto and the display panel 100 can be of other types. Also, the size of the upper polarizing film 117 is larger than the size of the upper substrate 113 so that the upper polarizing film 117 fully and completely covers the entire upper surface of the upper substrate 113. Furthermore, a predetermined portion of an upper surface of the panel protection member 119 is covered by the upper polarizing film 117.

The lower substrate 111 is preferably a thin film transistor array substrate including a display area and a non-display area. In the display area of the lower substrate 111, there are a plurality of gate lines, a plurality of data lines, and a plurality of pixels, wherein the gate and data lines cross each other, and each pixel is formed at every pixel region provided by crossing the gate and data lines. Each pixel may include a thin film transistor connected with the corresponding gate and data lines, a pixel electrode connected with the corresponding thin film transistor, and a common electrode provided adjacent to the pixel electrode and supplied with a common voltage. In this case, the common electrode may be formed on the upper substrate 113 according to a driving mode of the liquid crystal layer.

In the non-display area of the upper substrate 111, there are a plurality of pad regions, and a gate driving circuit.

Each of the pad regions is formed in the non-display area of a lower side (which can be the longer side) of the lower substrate 111, and is connected with each data line formed in the display area. Each of the pad regions is connected with a panel driver including a data driver.

The gate driving circuit is formed at one side or both sides (which can be the shorter sides) of the non-display area during a process for manufacturing the thin film transistor of each pixel, and is connected with each gate line formed in the display area. The gate driving circuit generates a gate signal (or scan signal) on the basis of gate control signal which is input from the panel driver, and sequentially supplies the gate signal to each gate line.

A lower polarizing film 115 is attached to a lower surface of the lower substrate 111, wherein the lower polarizing film 115 polarizes light which is emitted from a backlight unit of a display device having the display panel 100 and then provided to the lower substrate 111. The lower polarizing film 115 is an example of an optical sheet or optical film.

The upper substrate 113 is preferably a color filter array substrate. The upper substrate 113 may include a black matrix (BM) provided to define each pixel region of the lower substrate 111, and a color filter layer provided in the pixel region to correspond each pixel. According to the driving mode of the liquid crystal layer, the common electrode supplied with the common voltage may be formed on the upper substrate 113.

The lower substrate 111 and upper substrate 113 confronting each other are coupled to each other with the liquid crystal layer interposed therebetween. For instance, the lower substrate 111 and upper substrate 113 coupled to each other are obtained by cutting and separating large-sized lower and upper substrates boned to each other, whereby a burr is inevitably generated in the side faces (or cut and separated sides) of the lower substrate 111 and upper substrate 113 separated by the above cutting and separating process.

The upper polarizing film 117 polarizes the light emitted to the outside through the display area of the lower substrate 111 and the upper substrate 113, and also prevents a scattered reflection occurring in the side faces (SF) of the lower substrate 111 and upper substrate 113 from being visible to the outside. To this end, the size of the upper polarizing film 117 is larger than the size of the upper substrate 113 so as to prevent the sides of the panel protection member 119 from being exposed to the outside. The upper polarizing film 117 is attached to the upper surface of the upper substrate 113 and the upper surface of the panel protection member 119 so as to cover the entire upper surface of the upper substrate 113 and a portion of the upper surface of the panel protection member 119.

The upper polarizing film 117 whose size is relatively larger than that of the upper substrate 113 is attached to the entire upper surface of the upper substrate 113 by a film attaching process using a roller, and then cut by a laser cutting process under the condition that the sides of the upper polarizing film 117 extend more than a first width (W1) from the side faces (SFs) of the upper substrate 113 toward the external of the side faces (SFs). That is, while the lower side of the upper polarizing film 117 attached to the entire upper surface of the upper substrate 113 is not overlapped with the pad region formed in the lower substrate 111, the upper, left and right sides of the upper polarizing film 117 extend more than the first width (W1) from the upper, left and right side faces of the upper substrate 113, and then cut by the laser cutting process under the condition that the upper, left and right sides of the upper polarizing film 117 are relatively greater by the first width (W1) than the respective upper, left and right side faces of the upper substrate 113. In this case, the first width (W1) is set to be, e.g., 250 μm to 350 μm from each side face (SF) of the upper substrate 113, preferably. If the first width (W1) is less than 250 μm, an attaching area between the upper polarizing film 117 and the panel protection member 119 may be too small so that the upper polarizing film 117 might be detached from the panel protection member 119. Meanwhile, if the first width (W1) is more than 350 μm, an attaching area between the upper polarizing film 117 and the panel protection member 119 may be increased, however, a bezel width of the display panel 110 is also increased, and the width of the panel protection member 119 and a deposition amount of the panel protection member 119 may be increased.

The panel protection member 119 covers the entire side faces (SFs) of the lower substrate 111 and upper substrate 113 so that the panel protection member 119 perfectly covers the burr formed in the side faces of the lower substrate 111 and upper substrate 113. The panel protection member 119 prevents the light leakage caused by the scattered reflection which occurs due to the burr formed in the side faces of the lower substrate 111 and upper substrate 113, prevents the side faces of the lower substrate 111 and upper substrate 113 from being damaged by an external shock, and also prevents external static electricity from flowing into the inside of the lower substrate 111.

In more detail, the panel protection member 119 is directly disposed below the lower surface of the upper polarizing film 117 whose side extends more than the first width (W1) from the side face of the upper substrate 113, and covers the entire upper, left and right side faces of the lower substrate 111 and upper substrate 113. Accordingly, predetermined portions of the panel protection member 119 and an adhesive portion (or boundary) between the panel protection member 119 and the side faces of the lower substrate 111 and upper substrate 113 are adequately covered by the upper polarizing film 117 so that it is possible to prevent the above adhesive portion and the upper substrate 113 from being visible to the outside in the front face of the upper polarizing film 117.

Preferably, the panel protection member 119 has a second width (W2) which is set to be about 300 μm to 500 μm (which may be more preferably, e.g., 390 μm to 430 μm) from each side face (SF) of the lower substrate 111 and upper substrate 113 coupled to each other. In this case, if the second width (W2) of the panel protection member 119 is less than 390 μm, effects of preventing the light leakage and preventing the inflow of static electricity may be reduced. Meanwhile, if the second width (W2) of the panel protection member 119 is more than 430 μm, effects of preventing the light leakage and preventing the inflow of static electricity may be improved, however, the display panel 110 may be increased in its bezel width, and a cost for materials of the display panel 110 may be wasted.

Optionally, the panel protection member 119 may be additionally formed at a lower edge of each of long upper side, left short side and right short side (or any one or more desirable sides) of the lower substrate 111. For instance, in one example, optionally, a thin layer/portion 119a of the panel protection member may extend to have a third width (W3) so as to cover one or more lower edge portions of the side(s) of the lower substrate 111 as shown in the enlarged area of FIG. 3. In this case, the extended portion 119a of the panel protection member 119 has the third width (W3) which is set to be, e.g., 0 μm to 250 μm from the side face (SF) of the lower substrate 111, preferably. If the third width (W3) of the extended portion 119a of the panel protection member 119 is more than 250 μm, the panel protection member 119 is increased in its entire thickness and width, whereby it is difficult to realize the intended shape of the panel protection member 119.

The panel protection member 119 may be formed of silicon-based or ultraviolet (UV) curing sealant (or resin). In consideration of tack time, it is preferable that the panel protection member 119 be formed of UV curing sealant. Also, the panel protection member 119 may be colored (for example, blue, red, bluish green or black), but is not limited to these colors. Preferably, the panel protection member 119 is formed of colored resin or light-shielding resin so as to prevent the light leakage at the side faces of the upper and lower substrates.

As mentioned above, the display panel 110 according to the first embodiment of the present invention minimizes the scattered reflection area occurring at the side faces of the lower substrate 111 and upper substrate 113 by completely omitting the chamfer process for forming the inclination face (slanted corner edges) in the side faces of the lower substrate 111 and upper substrate 113, prevents the light leakage caused by the scattered reflection in the side faces of the lower substrate 111 and upper substrate 113 by perfectly covering the side faces of the lower substrate 111 and upper substrate 113 through the use of the upper polarizing film 117 and panel protection member 119, and also prevents the upper substrate 113 from being directly exposed to the external elements and to other outside factors. That is, the first and second substrates 111 and 113 do not have any slanted corner edges on their side faces which were used in the background art.

Figure 4:
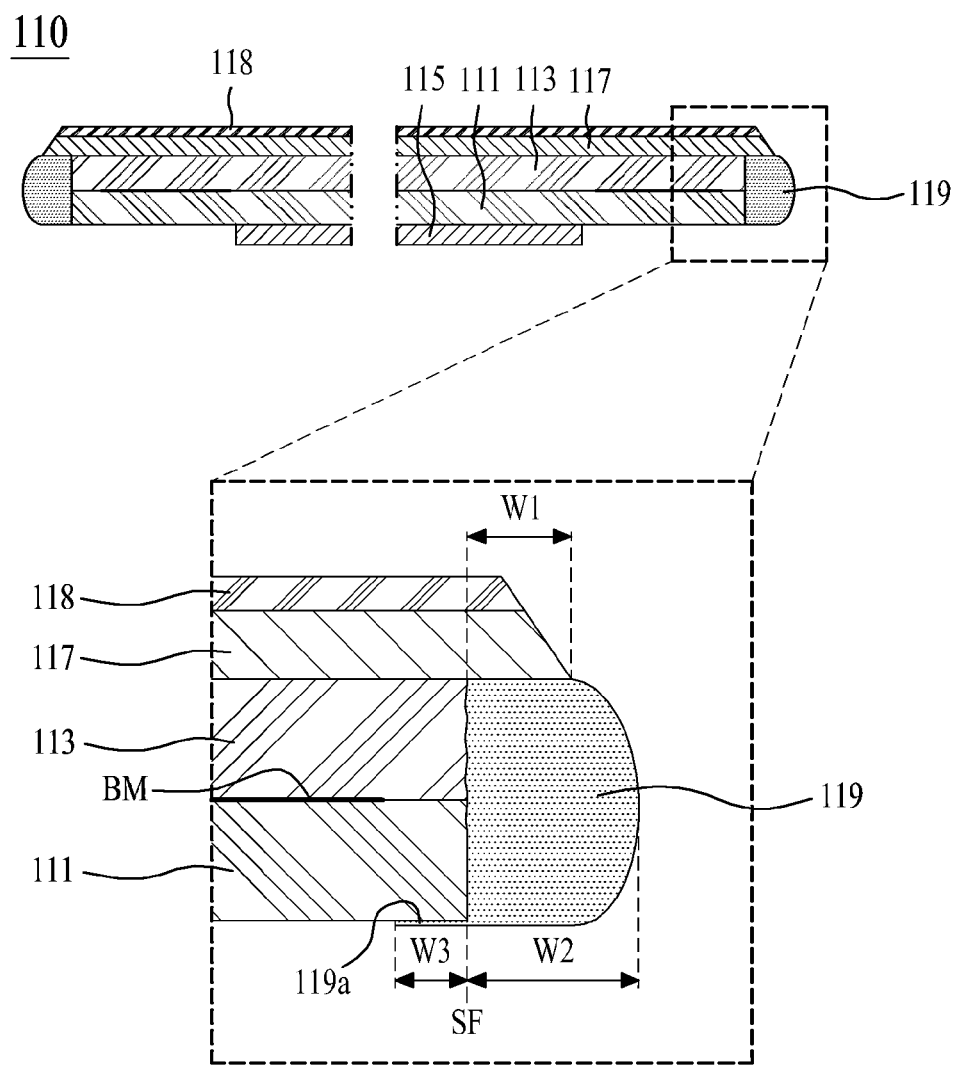
FIG. 4 is a cross sectional view illustrating a display panel according to a second embodiment of the present invention.

FIG. 4 is a cross sectional view illustrating a display panel according to the second embodiment of the present invention, which includes an additionally-provided 3-dimensional image optical member. Hereinafter, since the display panel of FIG. 4 is the same as the display panel of FIG. 3, except for the addition of a 3-dimensional image optical member 118, the description thereof is minimized for the sake of brevity, and only the 3-dimensional image optical member 118 will be described in detail as follows.

The 3-dimensional image optical member 118 is formed on the entire upper surface of the upper polarizing film 117 so that the 3-dimensional image optical member 118 is directly disposed under the panel protection member 119, to thereby display 3-dimensional images according to light transmitting through the upper polarizing film 117. In this case, on the basis of a 3-dimensional image display mode of the display device having the display panel 110 of FIG. 4, an image seen through the left eye (hereinafter, referred to as 'left-eye image') and an image seen through the right eye (hereinafter, referred to as 'right-eye image'), which are spatially and temporally separated from each other, are displayed on the display panel 110, wherein the 3-dimensional image optical member 118 separates the left-eye image and the right-eye image from each other, and then provides the separates left-eye image and right-eye image to a viewer. In this case, the 3-dimensional optical member 118 may include a retarder film for providing 3-dimensional images of polarizing method to the viewer, or a lens film for providing 3-dimensional images of glassless method to the viewer.

After the 3-dimensional image optical member 118 is attached to the entire upper surface of the upper polarizing film 117 by a film attaching process using a roller, wherein the 3-dimensional image optical member 118 is identical in size to the upper polarizing film 117, then the 3-dimensional image optical member 118 together with the upper polarizing film 117 (both of which having the same size to each other) may be cut by a laser cutting process under the condition that the 3-dimensional image optical member 118 extends well beyond each side face (SF) location of the upper substrate 113 by a distance greater than but less than the first width (W1) as shown in the enlarged area of FIG. 4. Thus both the member 118 and the film 117 cover the panel protection member 119. Further, it is preferably that when the edges of the 3-dimensional image optical member 118 disposed on the upper polarizing film 117 are cut, the edges may be cut in a slant angle so as to form a continuous slant edge by the edges of the member 118 and film 117.

FIGS. 5A to 5D illustrate a method for manufacturing a liquid crystal panel according to the first and second embodiments of the present invention, which relates to a method for manufacturing the above liquid crystal panel shown in FIG. 3

Figure 5A:
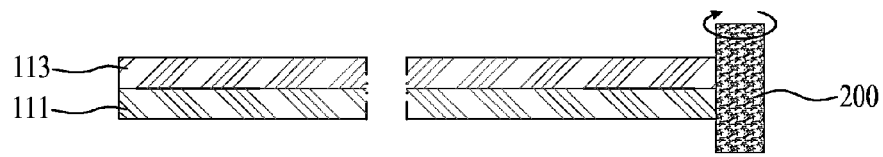
FIGS. 5A to 5D illustrate a method for manufacturing a liquid crystal display panel according to the first and second embodiments of the present invention.

First, as shown in FIG. 5A, the large-sized lower and upper substrates (not shown) are cut and separated by the cutting and separating process, and then the side faces (cut and separated sides) of the lower substrate 111 and upper substrate 113 are ground by a vertical grinding method. That is, since the side faces of the lower substrate 111 and upper substrate 113 coupled to each other are ground through the use of a grind pad 200 during the above grinding process, it is possible to adjust a size allowance by the substrate cutting and separating process, and to reduce the burr generated by the substrate cutting and separating process. Particularly, the above grinding process is carried out under the conditions that the side faces of the lower substrate 111 and upper substrate 113 are perpendicular with respect to the upper surface of the upper substrate 113 without being inclined with respect to the upper surface of the upper substrate 113.

Figure 5B:
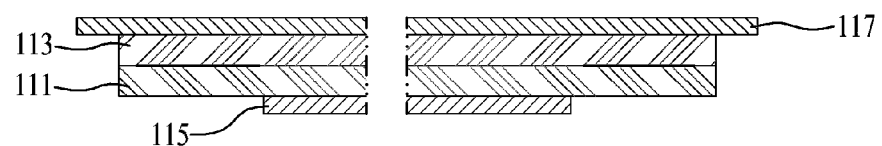

Then, as shown in FIG. 5B, the upper polarizing film 117 whose size is relatively larger than that of the upper substrate 113 is attached to the entire upper surface of the upper substrate 113. In this case, the upper, left and right sides (or any one or more desirable sides) of the upper polarizing film 117 extend (or protrude) more than a predetermined width from the upper, left and right side faces (or any one or more corresponding sides) of the upper substrate 113 so that the sides of the upper polarizing film 117 protrude well beyond the lower and upper substrates 111 and 113. As mentioned above, the upper polarizing film 117 is an example of an optical sheet or optical film.

Before or after the attaching process of the upper polarizing film 117, the lower polarizing film 115 may be attached to the lower surface of the lower substrate 111.

Figure 5C:
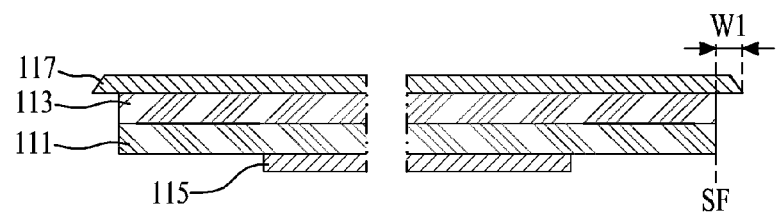

As shown in FIG. 5C, the respective ends of the upper, left and right sides of the upper polarizing film 117 attached to the upper substrate 113 are cut in such a manner that each end portion of the upper, left and right sides of the upper polarizing film 117 is extended to have the first width (W1) greater than each of the upper, left and right side faces (SFs) of the upper substrate 113.

Figure 5D:
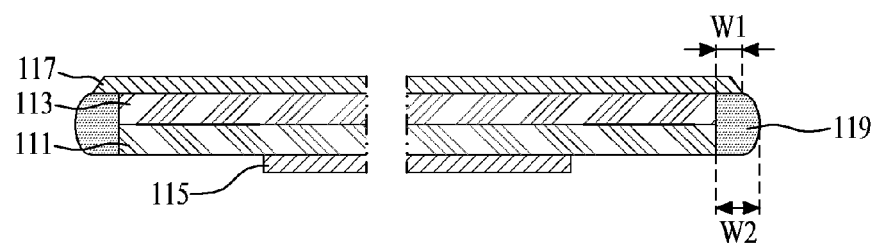

As shown in FIG. 5D, a sealant is deposited under the lower surface of the upper polarizing film 117 extending more than the first width (W1) from the side face (SF) of the upper substrate 113, and is also deposited adjacent to the entire side faces (SFs) of the upper substrate 113. The sealant is simultaneously cured, to thereby form the panel protection member 119 having the second width (S2) from each side face (SF) of the upper substrate 113. In this case, the panel protection member 119 may be formed through the use of sealant forming means which is transferred along the left, upper and right side faces of the lower substrate 111 and upper substrate 113 so as to deposit the sealant on the entire side faces (SFs) of the lower substrate 111 and upper substrate 113, and to irradiate the deposited sealant with light. The second width (W2) is greater than the first width (W1) such that the panel protection member 119 may protrude beyond the edges of the upper polarizing film 117. Further, if the extended portion 119a of FIG. 3 is optionally provided, then the sealant may be deposited and cured on lower portion(s) of the lower substrate 111 appropriately.

The attaching process for the lower polarizing film 115 may be carried out after the laser cutting process for the upper polarizing film 117, or may be carried out after the process for forming the panel protection member 119.

Meanwhile, a process for attaching the 3-dimensional image optical member (See 118 in FIG. 4) whose size is identical to that of the upper polarizing film 117 may be additionally carried out after the attaching process of the upper polarizing film 117. For the laser cutting process of the upper polarizing film 117, both the 3-dimensional image optical member 118 and the upper polarizing film 117 may be cut at the same time to form the optical member 118 as shown in FIG. 4.

The display panel 110 according to the first and second embodiments of the present invention and any other embodiments of the present invention described herein may be included in display devices such as mobile information devices including mobile terminals, smart phones, navigation devices, notebook computers, televisions, smart TVs, 3-D TVs, 3-D monitors, computer monitor, etc. to thereby display 2-dimensional images and/or 3-dimensional images.

Figure 6:
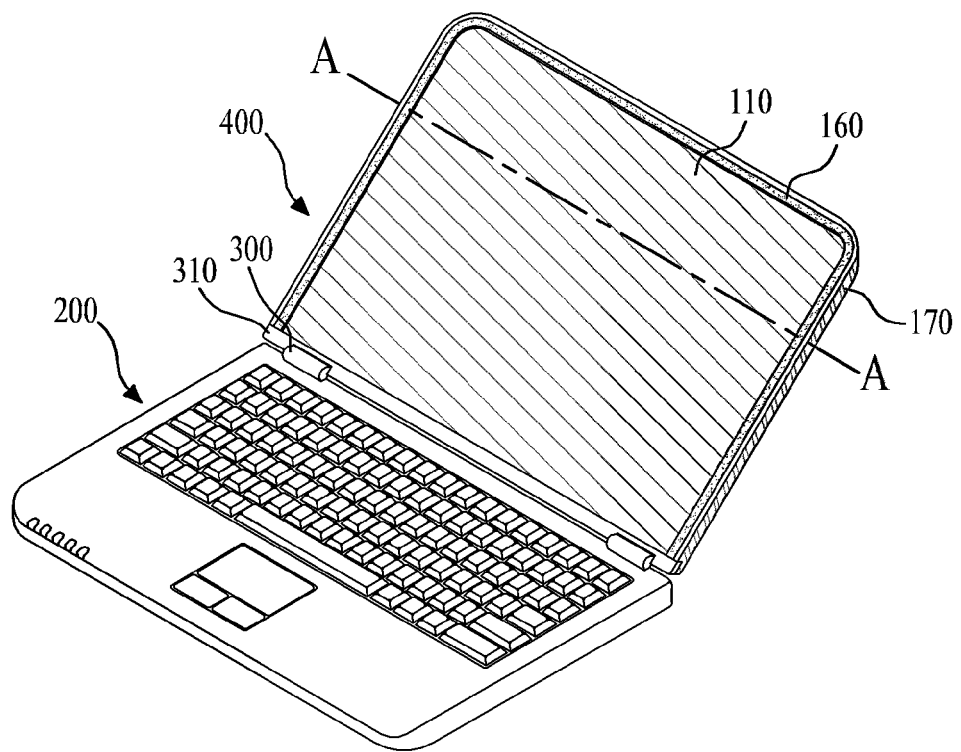
FIG. 6 illustrates a display device according to an embodiment of the present invention, which is applied to a notebook computer as an example.
Figure 7:
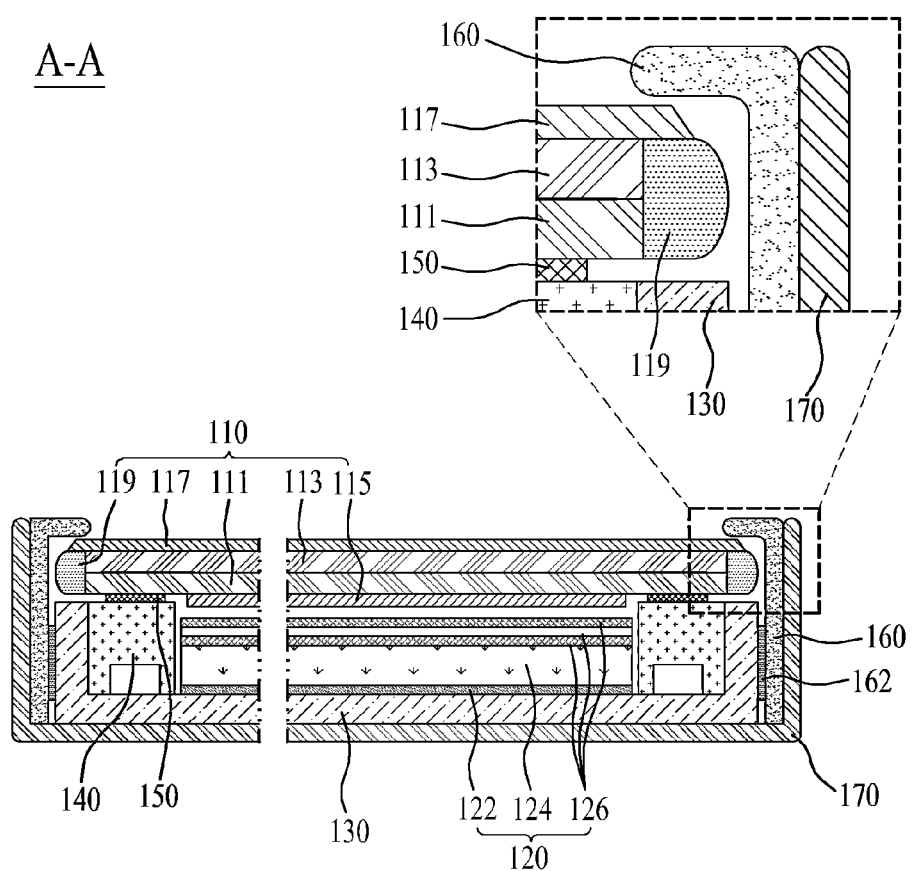
FIG. 7 is a cross sectional view illustrating the display device cut along line A-A of FIG. 6.

FIG. 6 illustrates a display device according to an embodiment of the present invention, which is applied to a notebook computer only as an example. FIG. 7 is a cross sectional view illustrating the display device cut along line A-A of FIG. 6.

Referring to FIGS. 6 and 7, the display device 400 may be rotatably connected to a system body 200 by the use of hinge 300.

The system body 200 may include a control circuit for processing various information, for example, CPU (Central Processing Unit), a graphic card for processing data according to control of the CPU, various storing mediums, and a power device. The system body 200 processes various information, and simultaneously displays predetermined video information on a display device 400.

The hinge 300 is connected between the system body 200 and the display device 400, to thereby rotatably support the lower side of the display device 400. In this case, a connection portion between the hinge 300 and the display device 400 is covered by a hinge cover 310.

The display device 400 is rotatably provided by the hinge 300 so that the display device 400 can be folded to cover the upper surface of the system body 200 or unfolded so as to have a predetermined angle from the upper surface of the system body 200 with respect to a rotation axis of the hinge 300. The display device 400 displays images corresponding to a video signal according to a video signal and a timing control signal supplied from the system body 200. To this end, the display device 400 may include a display panel 110, a backlight unit 120, a bottom cover 130, a guide panel 140, a panel adhesive member 150, a protection pad member 160, and a rear cover 170.

The display panel 110 in FIGS. 6 and 7 is identical in structure to the above display panel (110) shown in FIG. 3 or 4, whereby a detailed description for the display panel 110 will be omitted for the sake of brevity.

The backlight unit 120 is arranged below the display panel 110, to thereby emit light to the display panel 110. To this end, the backlight unit 120 may include a reflective sheet 122, a light guide plate 124, an optical member, and an optical sheet 126.

The reflective sheet 122 is provided on the lower surface of the light guide plate 124 while being received in the bottom cover 130, wherein the reflective sheet 122 reflects the light guided by the light guide plate 124 toward the display panel 110.

The light guide plate 124 is formed in a shape of plate (or wedge) to have at least one light-incidence portion prepared in at least one side face, and is provided on the reflective sheet 122. The light guide plate 124 internally reflects and refracts the light incident on the light-incidence portion from a light source member toward the lower surface of the display panel 110. In this case, the light proceeding to the lower surface of the light guide plate 124 is reflected on the reflective sheet 122, whereby the light is guided to the display panel 110.

The light source member coupled to the light-incidence portion is received in the bottom cover 130, to thereby emit the light to the light-incidence portion. To this end, the light source member may include a plurality of light emitting diodes or other known light sources.

The optical sheet 126 is provided on the light guide plate 124, and the optical sheet 126 improves luminance properties of the light proceeding toward the display panel 110 from the light guide plate 124. To this end, the optical sheet 126 may include at least one diffusion sheet and/or at least one prism sheet.

The bottom cover 130 has a case shape with a space for receiving the backlight unit 120 and the guide panel 140 therein. The bottom cover 130 may include a bottom plate for supporting the backlight unit 120 and the guide panel 140, and a sidewall being vertically bent from the bottom plate. In this case, the sidewall of the bottom cover 130 is positioned below the panel protection member 119 of the display panel 110 so that the side face of the display panel 110 and the side face of the panel protection member 119 are not covered or encapsulated by the sidewall of the bottom cover 130.

The guide panel 140 is formed in a rectangular-shaped band so that the guide panel 140 is received in the space of the bottom cover 130. The guide panel 140 supports the lower edge of the display panel 110, and also defines a position of the backlight unit 120 provided in the space of the bottom cover 130.

The guide panel 140 may be connected with the bottom plate of the bottom cover 130 by a rear connection method using a screw or a sliding connection method using an additional bracket, or may be connected with the sidewall of the bottom cover 130 by a side connection method using a screw.

By the use of a panel adhesive member 150, the guide panel 140 and the display panel 110 adhere to each other so that the display panel 110 is stably supported by the guide panel 140. To this end, the panel adhesive member 150 adheres to the upper surface of the guide panel 140, and also adhered to the lower surface of the lower substrate 111 of the display panel 110, preferably. The panel adhesive member 150 may be double-sided tape or photo-curing adhesive.

The protection pad member 160 is adhered to the side faces of the bottom cover 130 by an adhesive member 162 such as double-sided tape or adhesive, to thereby cover the side faces and upper edges of the display panel 110. In detail, the protection pad member 160 adheres to the upper, left and right side faces (or any desirable one or more sides) of the bottom cover 130 by the use of adhesive member 162, thereby covering the upper edges of the upper, left and right sides (or applicable sides) of the upper polarizing film 117, and covering the side faces of the display panel 110. To this end, the protection pad member 160 may have a "∩"-shaped plane shape, and also have a "⌐"-shaped cross section shape, and the protection pad member 160 may be formed of a shock-absorbing material such as silicon or rubber. That is, the protection pad member 160 absorbs a shock which might occur when the display device 400 is folded toward the system body 200, to thereby prevent the display panel 110 from being pressed down or damaged.

The rear cover 170 is connected with the bottom plate of the bottom cover 130, to thereby cover the rear of the bottom cover 130 and the side face of the protection pad member 160. In this case, the rear cover 170 may be connected with the bottom surface of the bottom cover 130 by the use of double-sided tape or adhesive. Also, the lower side of the rear cover 170 is connected with the hinge 300, and is covered by the hinge cover 310. The hinge cover 310 prevents the hinge 300 and the lower edge of the display panel 110 being adjacent to the hinge 300 from being exposed to the outside.

Figure 8:
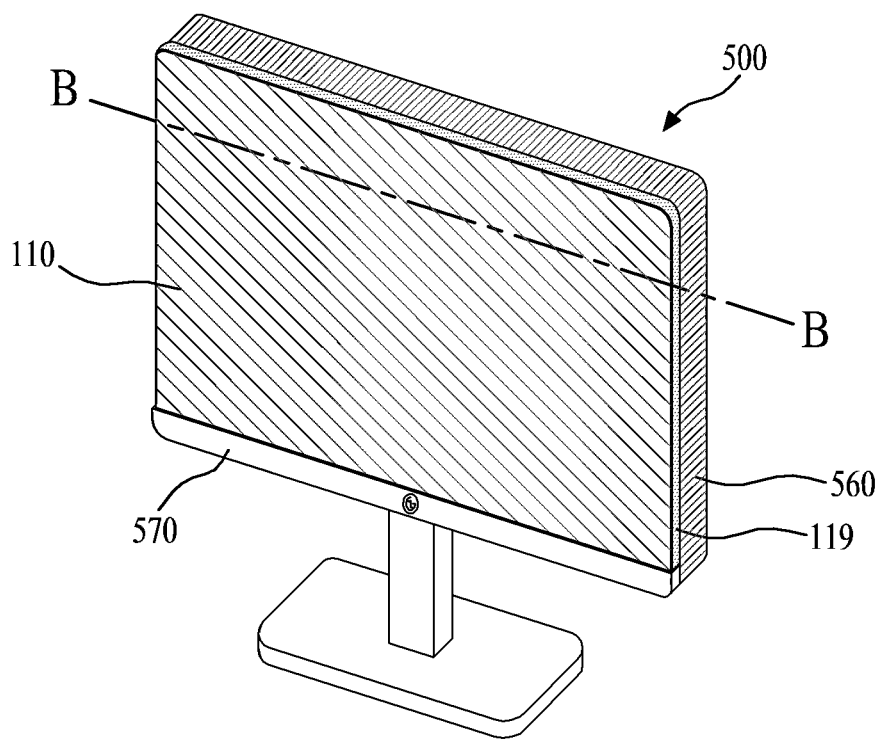
FIG. 8 illustrates a display device according to another embodiment of the present invention, which is applied to a television or computer monitor as an example.
Figure 9:
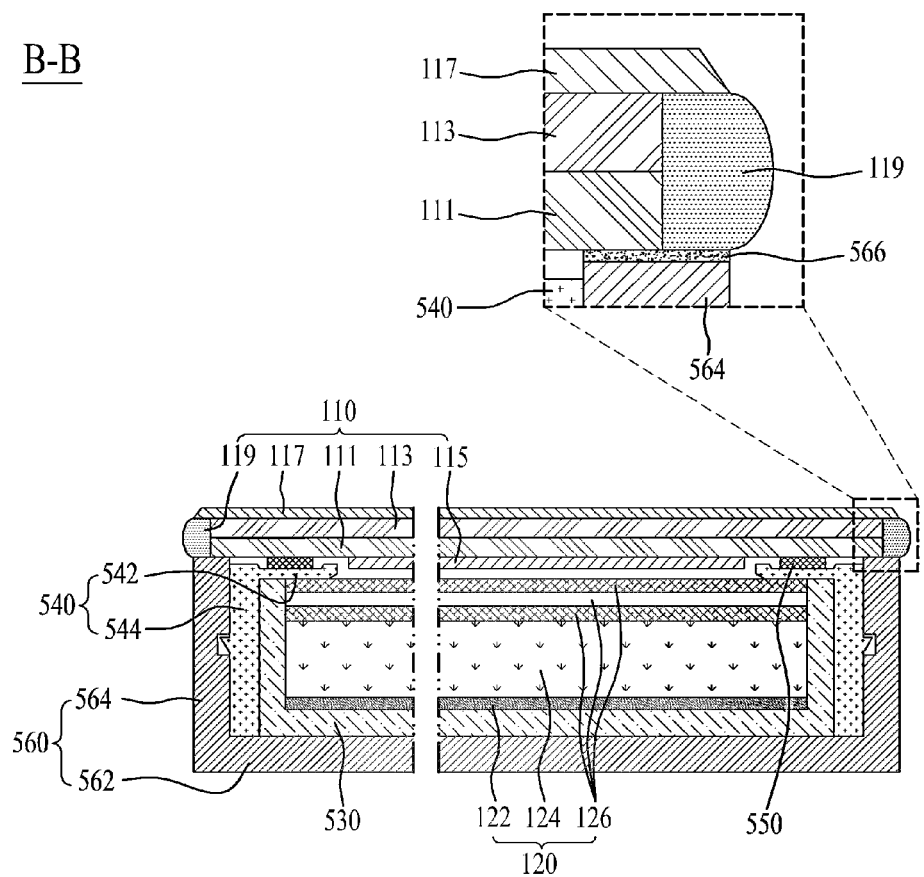
FIG. 9 is a cross sectional view illustrating the display device cut along line B-B of FIG. 8.

FIG. 8 illustrates a display device according to another embodiment of the present invention, which is applied to a television or computer monitor only as an example. FIG. 9 is a cross sectional view illustrating the display device cut along line B-B of FIG. 8.

Referring to FIGS. 8 and 9, a display device 500 may include a display panel 110, a backlight unit 120, a bottom cover 530, a guide panel 540, a panel adhesive member 550, a rear cover 560, and a front lower cover 570.

The display panel 110 is identical in structure to that of the above display panel shown in FIG. 3 or 4, whereby a detailed description for the display panel 110 will be omitted.

The backlight unit 120 is arranged below the display panel 110, to thereby emit light to the display panel 110. The backlight unit 120 may be an edge type or a direct type. For example, the edge type backlight unit 120 may include a reflective sheet 122, a light guide plate 124, a light source member, and an optical sheet 126. This edge type backlight unit 120 is identical to the above backlight unit (120) shown in FIG. 7, whereby a detailed description for the edge type backlight unit 120 will be omitted. If the backlight unit 120 is the direct type, the direct type backlight unit 120 may include a diffusion plate, a light source member arranged below the diffusion plate, and an optical sheet arranged on the diffusion plate.

The bottom cover 530 has a case shape with a space for receiving the backlight unit 120 therein. The bottom cover 530 may include a bottom plate for supporting the backlight unit 120, and a sidewall being vertically bent from the bottom plate. The bottom cover 530 may be omitted so as to realize slimness of the display device. In this case, the backlight unit 120 is received in the rear cover 560.

The guide panel 540 is formed in a rectangular-shaped band to have "⌐" shape so that the guide panel 540 is supported by the bottom cover 530. To this end, the guide panel 540 may include a panel supporter 542 for supporting the boundaries of the lower surface of the display panel 110, wherein the panel supporter 542 is supported by the bottom cover 530, and a guide sidewall 433, which is vertically bent from the panel supporter 542, for covering the side faces of the bottom cover 530. If removing the bottom cover 530, the guide panel 540 is received in the rear cover 560.

By the use of the panel adhesive member 550, the guide panel 540 and the display panel 110 adhere to each other so that the display panel 110 is stably supported by the guide panel 540. To this end, the panel adhesive member 550 adheres to the panel supporter 542 of the guide panel 540, and also adheres to the lower substrate 111 of the display panel 110, preferably. The panel adhesive member 550 may be double-sided tape or photo-curing adhesive.

The rear cover 560 is formed in a case shape having a space for receiving the backlight unit 120, the bottom cover 530 and the guide panel 540 therein. The rear cover 560 does not cover the side faces of the display panel 110. To this end, the rear cover 560 may include a cover plate 562, and a cover sidewall 564 being vertically bent from the cover plate 562. The cover plate 562 supports the bottom plate of the bottom cover 530, and the guide sidewall 544 of the guide panel 540.

The cover sidewall 564 covers the side faces of the guide panel 540 (that is, the guide sidewall 544 of the panel 540), and also supports the lower edges of the display panel 110. In this case, the upper surface of the cover sidewall 564 is disposed below the lower edge surfaces of the lower substrate 111 and/or of the panel protection member 119, and may adhere to the lower edges of the lower substrate 111 and/or of the panel protection member 119 through the use of an adhesive member 566 as shown in the enlarged area of FIG. 9. In one example, the side ends of the upper polarizing film 117 are aligned with the outer side surfaces of the cover sidewall 564. In addition, the outer side surfaces (i.e., SFs) of the first and second substrates 111 and 113 end above a middle of the upper surfaces of the cover sidewall 564. These features can be seen, only as an example, in the enlarged area of FIG. 9.

The cover sidewall 564 and the guide sidewall 544 may be connected with each other by a side connection method using hook or screw.

The front lower cover 570 (FIG. 8) is connected with the cover sidewall 564 so as to cover the lower edges of the display panel 110 so that it is possible to prevent a plurality of pad regions formed in a non-display area along a lower long side of the lower substrate 111 and a panel driver connected with the plurality of pad regions from being exposed to the external.

Figure 10:
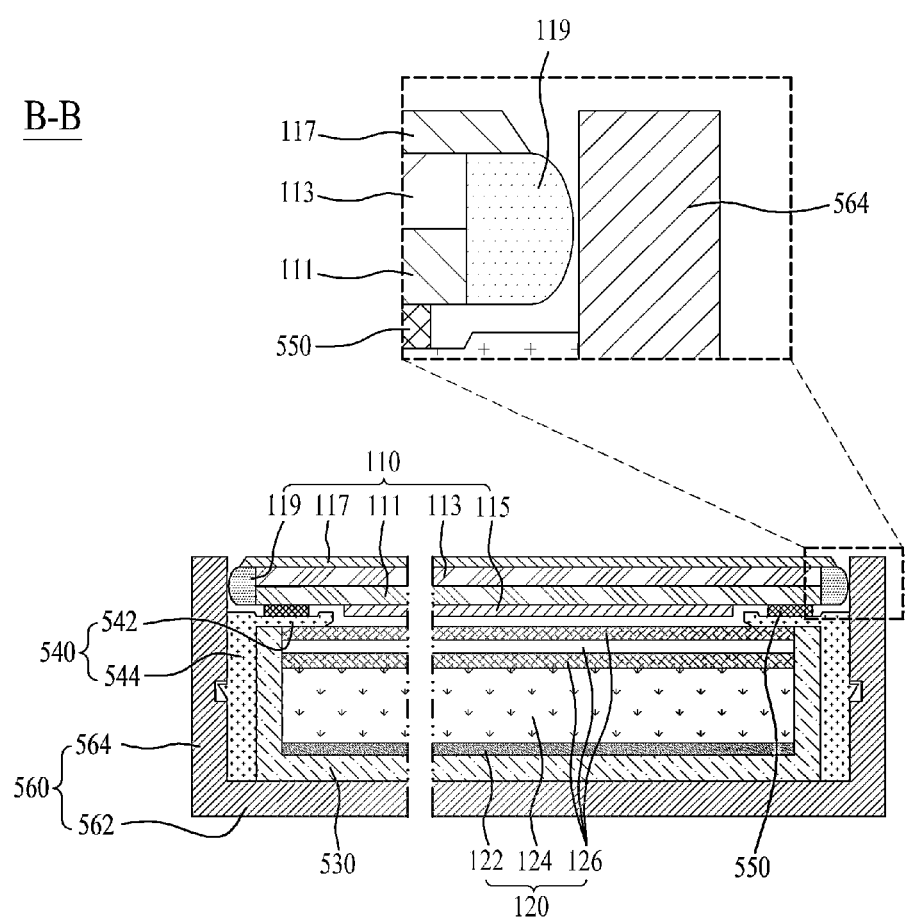
FIG. 10 illustrates a display device which is a variation of the display device of FIG. 9 according to another example of the present invention.

FIG. 10 illustrates a display device which is a variation of the display device of FIG. 9 according to another example of the present invention. As a variation to the example of FIG. 9, optionally, as shown in FIG. 10, the cover sidewall 564 vertically bent from the end of the cover plate 562 provides a predetermined space, and simultaneously covers the side face(s) of the panel protection member 119. At this time, a height of the cover sidewall 564 is set such that the upper surface of the cover sidewall 564 is located at level that is identical to or substantially identical to the level at which the upper surface of the upper polarizing film 117 is location. For instance, the upper surface of the upper polarizing film 117 and the upper surface of the cover sidewall 564 may be coplanar to each other. Further the cover sidewall 564 is exposed to the outside so as to cover the side faces of the display panel 110. As a result, the cover sidewall 564 forms the border (or bezel) of the display panel 110.

In the above-mentioned embodiments of the present invention, the display panel and the display device relate to the liquid crystal display device, but are not limited to the liquid crystal display device as mentioned above. The display panel and the display device according to the embodiments of the present invention may be applied to various flat display devices, for example, organic light emitting display device. For example, in case of the display panel and the display device relating the organic light emitting display device, as mentioned above, an organic light emitting diode is formed on a lower substrate, and the organic light emitting diode is driven through a panel driver connected with the lower substrate, whereby images are displayed by the use of light emitted to the external through the lower substrate or upper substrate.

According to the present invention, the chamfer process for forming the inclination face (slanted corner edges) on the side faces (SFs) of the lower and upper substrates 111 and 113 coupled to each other is completely omitted, and the panel protection member 119 is formed to abut only the side faces of the lower and upper substrates 111 and 113, so that it is possible to prevent the light leakage caused by the scattered reflection occurring in the side face of the lower and upper substrates 111 and 113.

Also, since the upper polarizing film 117 is larger than the upper substrate 113 (i.e., the upper polarizing film 117 extends well beyond the side ends of the upper and lower substrates 111 and 113), it is possible to prevent the upper substrate 113 from being directly exposed to the external environment and any other outside elements.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A display panel comprising:
    a lower substrate and an upper substrate coupled to each other, wherein the upper and lower substrates are configured to display images;
    an optical film disposed on an upper surface of the upper substrate; and
    a panel protection member for covering all side faces of each of the lower and upper substrates,
    wherein the optical film is longer than the upper substrate to form an extended portion having a same first width from each side face of the lower and upper substrates to an outermost portion of each corresponding outer side face of the extended portion,
    wherein the panel protection member has a same second width from each side face of the lower and upper substrates to an outermost portion of each corresponding outer side face of the panel protection member, and
    wherein the second width is larger than the first width.

2. The display panel of claim 1, wherein a specific portion of the panel protection member is disposed directly below the extended portion of the optical film, and contacts outermost side faces of each of the upper and lower substrates.

3. The display panel of claim 1, wherein the first width is about 250 μm to 350 μm.

4. The display panel of claim 1, wherein the second width is about 390 pm to 430 pm from outermost side faces of the upper and lower substrates.

5. The display panel of claim 1, wherein the upper surface of the upper substrate and one outermost side face of the upper substrate extending directly from the upper surface form a substantially perpendicular angle.

6. The display panel of claim 1, further comprising:
    a 3-dimensional image optical member attached to an upper surface of the optical film.

7. The display panel of claim 1, wherein the panel protection member is formed of photo-curing sealant of colored resin or light-shielding resin.

8. The display panel of claim 1, wherein the panel protection member is formed of a colored or light-shielding resin, and a width from the outermost side faces of each of the upper and lower substrates to an outermost portion of the panel protection member is about 300 μm to 500 μm.

9. The display panel of claim 1, wherein an end of the extended portion of the optical film has an inclination face, and the inclination face is disposed on the panel protection member.

10. The display panel of claim 1, wherein the second width is larger than the first width by at least 50 μm.

11. A display device comprising:
    a display panel including:
    a lower substrate and an upper substrate coupled to each other, wherein the upper and lower substrates are configured to display images;
    an optical film disposed on an upper surface of the upper substrate; and
    a panel protection member for covering all side faces of each of the lower and upper substrates, wherein the optical film is longer than the upper substrate to form an extended portion having a same first width from each side face of the lower and upper substrates to an outermost portion of each corresponding outer side face of the extended portion, wherein the panel protection member has a same second width from each side face of the lower and upper substrates to an outermost portion of each corresponding outer side face of the panel protection member, and wherein the second width is larger than the first width;

a guide panel for supporting a lower surface of the display panel;

a bottom cover including a lower segment disposed under all portions of the display panel, wherein a sidewall of the bottom cover is positioned directly below all portions of the panel protection member in a vertical direction;

a panel adhesive member for coupling the guide panel and the display panel to each other, wherein an upper surface of the panel adhesive member is coupled to a portion of a lower surface of the lower substrate;

a rear cover for receiving the guide panel therein; and a sidewall adhesive member directly connected between an upper surface of the sidewall, and both the lower surface of the lower substrate and a lower surface of the panel protection member.

12. The display device of claim 11, wherein a specific portion of the panel protection member of the display panel is disposed directly below the extended portion of the optical film, and contacts outermost side faces of each of the upper and lower substrates.

13. The display device of claim 11, wherein the first width is about 250 μm to 350 μm.

14. The display device of claim 11, wherein the upper surface of the upper substrate and one outermost side face of the upper substrate extending directly from said upper surface in the display panel form a substantially perpendicular angle.

15. The display device of claim 11, wherein the display panel further includes:

a 3-dimensional image optical member attached to an upper surface of the optical film.

16. The display device of claim 11, wherein the panel protection member of the display panel is formed of photo-curing sealant of colored resin or light-shielding resin.

17. The display device of claim 11, wherein an end of the extended portion of the optical film has an inclination face, and the inclination face is disposed on the panel protection member.

18. The display device of claim 11, wherein the second width is larger than the first width by at least 50 μm.

* * * * *